May 5, 1925.  
P. C. SEEL  
1,536,311  
INTERMEDIATE PRODUCT IN THE MANUFACTURE OF CELLULOSE ACETATE  
Original Filed Aug. 18, 1923
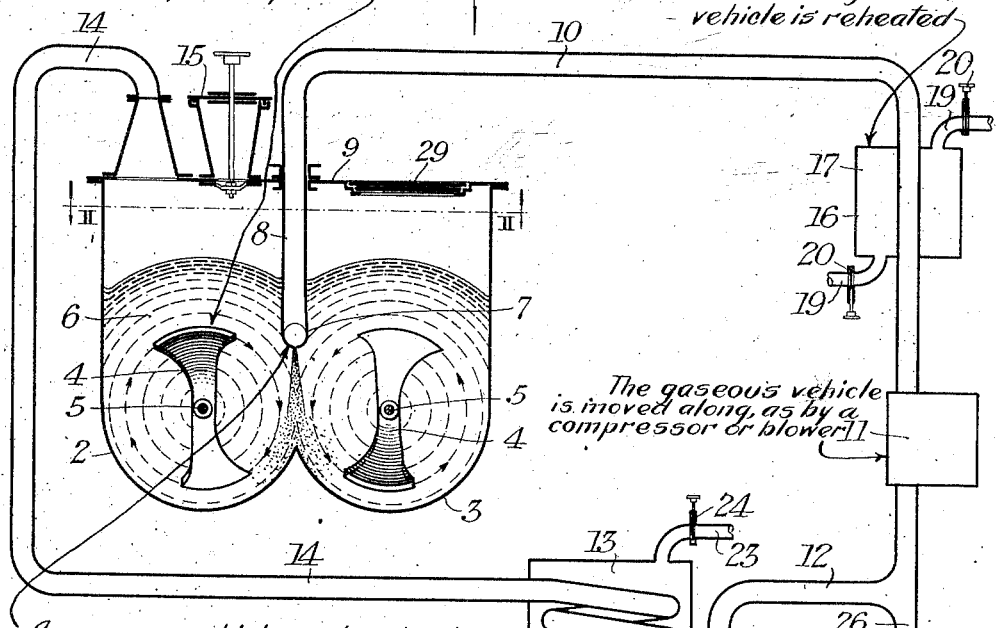
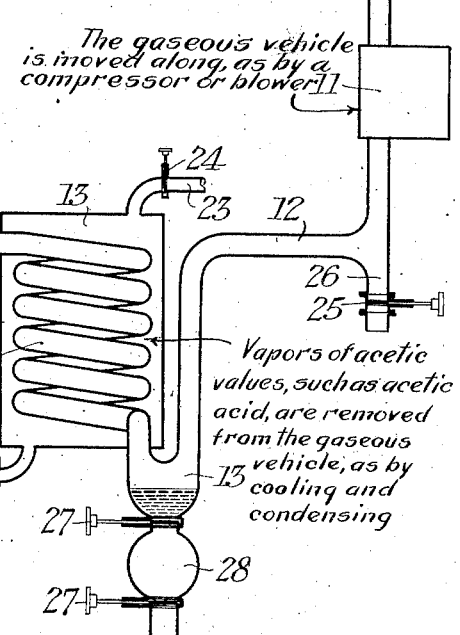
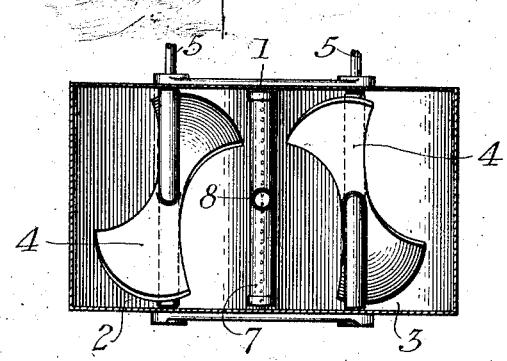
INVENTOR,  
*Paul C. Seel,*  
BY *R. L. Stinchfield*  
ATTORNEY Patented May 5, 1925.

1,536,311

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

INTERMEDIATE PRODUCT IN THE MANUFACTURE OF CELLULOSE ACETATE.

Continuation of application Serial No. 658,109, filed August 18, 1923. This application filed April 2, 1924. Serial No. 703,797.

*To all whom it may concern:*

Be it known that I, PAUL C. SEEL, a citizen of the United States of America, residing at Rochester, in the county of Monroe and State of New York, have invented certain new and useful Improvements in an Intermediate Product in the Manufacture of Cellulose Acetate, of which the following is a full, clear, and exact specification.

This invention relates to an intermediate product in the manufacture of cellulose acetate. One object of the invention is to provide an intermediate product in a form having large surface relative to i's mass, to facilitate its treatment by liquids in the further steps of manufacture. Another object is to provide such an intermediate product in a powdery form, in which the grains remain substantially separate without coalescing when stored at room temperature and pressure, so that when treated by liquids, the action will be substantially uniform on all particles, thereby avoiding lack of homogeneity in the final cellulose acetate product. Other objects will hereinafter appear.

In the drawing,—

Fig. 1 is a diagrammatic side elevation, partly in vertical section, illustrating one form of apparatus in which the process of preparing my intermediate product may be carried out, the relative sizes of the parts being exaggerated for the sake of clearness;

Fig. 2 is a horizontal sectional view of the mixing unit taken on the line 2—2 of Fig. 1.

This application is a continuation of my prior application No. 658,109, filed Aug. 18, 1923 Patent No. 1,494,816, May 20, 1924 for process of manufacturing cellulose acetate.

As a result of that process there was produced a powdery mass, the grains or particles of which comprised cellulose acetate mixed with acetic values. The latter were not, however, present in such quantities, at least on the surfaces of the particles, as to cause the grains to coalesce. In the other words, the grains remained substantially separate when stored at room temperature and pressure. In this way this intermediate product retained its very large surface relative to its mass, facilitating its treatment in further steps of the process with various liquids, such as hydrolyzing baths, solvent liquids, washing liquids, or the like. This intermediate product may be made by one manufacturer and shipped to another, and, therefore, constitutes a valuable commercial factor in a novel form.

One of the numerous ways of preparing this intermediate product is given in my hereinabove cited prior application, and will now be described by way of illustration.

Cellulose acetate is produced by the action of suitable acetylating agents on cellulose in the presence of catalysts. The reaction mixture may, for example, initially comprise cellulose, acetic anhydride, acetic acid, and sulfuric acid, and the products of the reaction as the latter proceeds. An example of this general type is given in United States Reissue Patent No. 12,637, Miles, Apr. 23, 1907. The acetylating reaction is at first carried on until a chloroform-soluble cellulose acetate is produced. Then a hydrolyzing mixture containing a relatively small amount of water is introduced until the reaction converts the cellulose acetate into the acetone-soluble form. Before the hydrolyzing mixture acts, the excess or unused acetic anhydride is converted into acetic acid by the addition of the proper amount of water. Sufficient water can be introduced in the hydrolyzing mixture to "kill" the acetic anhydride and cooperate in the conversion of the cellulose acetate.

If the reaction is terminated when the cellulose acetate is in the chloroform-soluble stage, a considerable amount of acetic values remain, such as acetic anhydride and acetic acid (and in some cases acetyl chloride). If the reaction be carried to the point where acetone-soluble cellulose acetate is produced, the acetic values will be in the form of acetic acid. Because of the relatively high value of these acetic values, they have a very important bearing upon the cost of the cellulose acetate which is produced. Their recovery in good condition, when effected inexpensively, lowers the total cost of the manufacturing operations and thereby cheapens the cost of the product, and I have been able to obtain such result while securing said intermediate product in the form of a powder containing cellulose acetate having many valuable properties.

The reaction mixture has heretofore been washed with a considerable excess of water to free it from the acetic values. The recovery of these values from the comparatively dilute solutions which are produced can be carried out only at considerable expense. Water evaporating steps and chemical re-action steps have proven to be complicated and undesirably expensive.

I have found that the desired intermediate product can be made and the recovery of the acetic values can be simply and inexpensively carried out by separating at least the major portions of the acetic values from the reaction mixture by means of a gaseous vehicle, such as air. Preferably I pass the vehicle through the reaction mixture to take up vapors of the acetic values and then recover the values from the laden vehicle by condensation, absorption, or the like. I have found it preferable to pass the gas through the reaction mixture in a subdivided form, such as by forcing air bubbles through it, so that a large amount of surface is presented through which vapors of the acetic values may enter the gas. The reaction mixture is, broadly speaking, liquid, by which I mean that it is flowable to a certain extent, even when it is sometimes thickened to a pasty condition.

I have likewise found that the manufacture of the novel intermediate product and the recovery of the acetic values are greatly facilitated by repeatedly circulating the gaseous vehicle, such as air, through the reaction mixture and the zone or station where the acetic values are removed from it. This recirculation enables the use of a stronger concentration of the vapors of acetic values in the air current, facilitating condensation, and prevents an unremoved fraction of these values being wasted in the manner that would take place if the air were discharged into the atmosphere to carry away the unextracted vapors.

I have also discovered that when the gaseous vehicle is agitated through the reaction mixture for a sufficient time the latter changes from a liquid or viscous form to a mass of separate particles of a somewhat powdery nature. The aggregate surface of these particles is much greater than the surface of the original reaction mixture. I have found that advantage can be taken of this large surface in the treatment of additional amounts of reaction mixture. When these amounts are stirred into the powdery mass and a gaseous vehicle is passed through, the additional amounts of reaction mixture are quickly converted to a subdivided or powdery condition, because of the increased rapid evaporation taking place from the enlarged surface.

My process may be carried out in many types of apparatus, the one shown in the drawing being merely illustrative of a useful form. The main receptacle in which the gaseous vehicle and reaction mixture are brought into intimate contact is indicated at 1. This is preferably an airtight vessel, except for the piping hereinafter described. It may conveniently take the form of a well known mixer in which the bottom is divided into two troughs 2, 3 above which are located mixing blades 4 rotated with shafts 5, driven by any suitable means (not shown). These blades may be of a form which merely turns the material about the shafts, but I prefer to use blades which give a longitudinal movement to the mixture also. See, for example, U. S. Patent No. 534,968, Pfleiderer, Feb. 26, 1895. The receptacle may be temperature controlled by steam jackets or coils or any other well known and customary way.

Entering into the reaction mixture 6 is a perforated transverse pipe 7. This connects with a vertical pipe 8 which passes through an airtight connection in the top 9. Pipe 8 is in turn connected by pipe line 10 with an air compressor or blower 11. The latter draws its supply of air through pipe 12 from the removal or recovery unit 13, which is in turn connected by pipe 14 with the top 9 of receptacle 1. In the top 9 of the receptacle 1 there is also located a normally closed or sealed loading fixture or pipe 15.

I find it useful to have a heating unit 16 for slightly warming the gaseous vehicle before it enters the main mixing receptacle 1. This is indicated diagrammatically in the drawing as a casing 17 surrounding a section of pipe 10, through which warm water or exhaust steam is passed through pipes 19 controlled by valves 20. The removal station 13, where vapors of acetic values (usually the vapors of acetic acid) are separated from the air, may take the form of any well known absorption or condensation tower. This is conventionally indicated in Fig. 1 as a cooling chamber 21 surrounding a coil 22, the cooling medium being passed in and out by means of pipes 23 controlled by valves 24. The entrance of additional air when required may be conveniently effected by manipulating valve 25 in pipe 26.

In carrying out my process in this apparatus a reaction mixture, such as any one of those shown at the different stages in the Miles patent cited above, is charged into receptacle 1 through pipe 15 until it rises above perforated pipe 7. The blades 4 are set in operation and the compressor or blower 11 started to force air through pipes 10, 8, and 7 into the reaction mixture 6. The bubbles thus formed in the mixture are agitated or forced through the material, the blades 4 assisting in this action. During this period the bubbles of the gaseous vehicle take up as much vapor of the acetic values as they can hold at the prevailing temperature. It is convenient to operate with the receptacle 1 and its contents at 80 to 85° F., but, of course, the thermal factors of a particular apparatus can be readily understood by those skilled in the art.

The bubbles of the vehicle, rising from the reaction mixture 6 and thoroughly laden with vapors of the acetic values, are drawn through pipe 14 to the removal zone 13, where they are condensed and may be drawn off through valves 27 in enlarged pipe 28. The amount of vapor which is condensed and removed at station 13 depends primarily upon the difference in temperature between it and receptacle 1. The condensing temperature is kept as low as practical without solidifying the acetic values which are condensed in it. I have found 60° F. to be useful when there is a slight amount of water present, because it enables the acetic acid to be condensed in the liquid form without clogging the condenser. This temperature, however, is, of course, subject to adjustment, as will be understood by those skilled in the art. There will, of course, be some vapor of acetic values left in the air after it leaves the condenser and when it reenters the mixture 6, but the amount is sufficiently below the saturation point to avoid interference with the process. In fact, it assists the dividing of the mixture into small particles, and assists the rate of evaporation because it prevents too hard and impervious a skin forming on the pieces of the mixture.

The cooled vehicle is drawn through pipe 12 by the compressor or blower 11. If a compressor is employed, it oftentimes warms the air up sufficiently to permit it to function properly when it passes through pipe 10 to the receptacle 1. I have found this to be true in one form of apparatus where the compressor is operating at from 3 to 5 pounds pressure. When, however, the compressor does not adequately warm the vehicle, or when a blower is employed, it is preferable to reheat the air to the required temperature (say 80 or 90° F.) by means of heating unit 16.

As the removal of the acetic values from the reaction mixture 6 progresses, the latter changes over from a viscous or pasty liquid to a powdery form comprising a mass of substantially separate particles,—at least they are sufficiently separate to permit the air to pass in between them when moved about blades 4. When this stage is reached, I add further amounts of reaction mixture through pipe 15 and continue the circulation of the air through the mass of reaction particles and the rest of the described apparatus. In this way the additional amounts of reaction mixture are distributed over the surfaces of the particles, which surfaces in the aggregate are relatively large compared to that of the original liquid. In this way the circulating vehicle is repeatedly brought into contact with the additional reaction mixture and quickly removes vapors of acetic values from it. The powdery mass is increased by repeating the charging of additional reaction mixture and continuing the blowing. The powdery mass may thus be gradually built up until it approaches the top of receptacle 1. It may then be removed through any suitable door, such as 29, in receptacle 1.

The addition of the reaction mixture during the building up of the powdery mass may be carried out intermittently or continuously, but in any event the rate of charging in the mixture and the rate of passing the air through the mass are so correlated that the powdery condition will be kept up substantially enough to secure the advantages due to its increased evaporating surface.

While the acetic acid vapors may be absorbed by bubbling the vapor-laden air through a suitable liquid and then distilling the acid from such liquid, nevertheless I greatly prefer to use the condensation method described above, because it recovers the acetic values in a form sufficiently pure for re-use in further acetylation.

The powdery mass, because of its very large surface relative to its weight, can be very rapidly treated by liquids in the further steps of manufacture, such as by water for washing, or baths for further hydrolysis, or by solvents.

The evaporation of acetic values from the grains of powder may be carried out until a very small portion remains therein,—in fact, until the powder is so relatively free from such values that it can be utilized directly in manufacturing cellulose acetate plastics. As the proportion of acetic values in the grains grows smaller and smaller, the difficulty of drying out or evaporating away the residue becomes increasingly more difficult. It is, therefore, often convenient to carry on the hereinabove described process until the acetic values constitute only a little less than 50% (say 30% for instance) of the weight of the powdery mass. This admits of a quick and inexpensive recovery of the biggest part of the acetic values from the original cellulose acetate reaction mass, and yet leaves an intermediate powdery product of general utility in the best possible condition for further treatment.

Having thus described my invention, what I claim as new and desire to secure by Letters Patent is:

1. As an intermediate product in the manufacture of cellulose acetate, a powder, the substantially separate grains of which comprise cellulose acetate mixed with acetic values and remain separate without coalescing when stored at room temperature and pressure.

2. As an intermediate product in the manufacture of cellulose acetate, a mixture of cellulose acetate and acetic values, the latter being less than one-half the weight of said mixture, and said mixture being in powder form, the grains thereof remaining substantially separate without coalescing at room temperature and pressure.

3. As an intermediate product in the manufacture of cellulose acetate, a cellulose acetate reaction mass in powder form, acetic values being dried out of the grains thereof until the latter refrain from coalescing at room temperature and pressure.

Signed at Rochester, New York, this 26th day of March, 1924.

PAUL C. SEEL.